United States Patent [19]

Rosenberg

[11] Patent Number: 4,672,291

[45] Date of Patent: Jun. 9, 1987

[54] VARIABLE-SPEED ELECTRICAL MACHINE

[75] Inventor: Heinz Rosenberg, Vienna, Austria

[73] Assignee: Siemens Aktiengesellschaft, Berlin and Munich, Fed. Rep. of Germany

[21] Appl. No.: 733,301

[22] Filed: May 10, 1985

[30] Foreign Application Priority Data

May 14, 1984 [DE] Fed. Rep. of Germany ....... 3417894

[51] Int. Cl.$^4$ .............................................. H02P 9/40
[52] U.S. Cl. ..................... 318/823; 318/350; 318/351; 318/533; 318/534
[58] Field of Search ............... 318/318, 424, 425, 428, 318/395, 508, 509, 533, 534, 820, 821, 823, 328, 350, 351, 254, 439, 244, 245, 246

[56] References Cited

U.S. PATENT DOCUMENTS

| 1,694,637 | 12/1928 | Bethenod | 318/351 X |
| 1,763,016 | 6/1930 | Stoller | 318/328 X |
| 1,874,716 | 8/1932 | Stoller | 318/351 X |
| 2,254,899 | 9/1941 | Laubenheimer et al. | 318/328 |
| 2,331,960 | 10/1943 | Button | 318/328 X |
| 2,489,982 | 11/1949 | Schwarz | 318/244 |
| 2,559,538 | 7/1951 | Jacobs | 318/351 |
| 2,711,502 | 6/1955 | Alexanderson | 318/244 |
| 2,752,549 | 6/1956 | Alexanderson | 318/533 X |
| 2,793,342 | 5/1957 | Rhyne | 318/328 X |
| 2,802,959 | 8/1957 | Powers | 310/156 |
| 2,821,673 | 1/1958 | Shapiro | 318/244 |
| 3,379,947 | 4/1968 | Lalonde | 318/823 X |
| 3,518,518 | 6/1970 | Ford et al. | 318/350 X |
| 4,449,079 | 5/1984 | Erdman | 318/254 X |

FOREIGN PATENT DOCUMENTS

| 0389801 | 6/1931 | United Kingdom | 318/328 |
| 0421694 | 1/1935 | United Kingdom | . |
| 0549077 | 11/1945 | United Kingdom | 318/351 |
| 0856760 | 12/1960 | United Kingdom | . |
| 1096101 | 12/1967 | United Kingdom | . |
| 1396784 | 6/1975 | United Kingdom | 318/823 |
| 0985911 | 1/1983 | U.S.S.R. | 318/318 |

Primary Examiner—William M. Shoop, Jr.
Assistant Examiner—Bentsu Ro
Attorney, Agent, or Firm—Volker R. Ulbrich

[57] ABSTRACT

This invention pertains to an electrical machine whose excitation is coordinated to the respective rpm in such a fashion that a desired characteristic of induced voltage or delivered output is produced. For that purpose at least one portion of the windings generating or controlling the working flux of the machine or a resistance wired in series before the machine is connected to a rectifier circuit, which is supplied, through a frequency-dependent impedance network, with an a.c. voltage of a frequency proportional to the machine rpm.

3 Claims, 14 Drawing Figures 4,672,291

VARIABLE-SPEED ELECTRICAL MACHINE

BACKGROUND OF THE INVENTION

This invention pertains to variable-speed electrical machines and more particularly to electrical machines having a frequency dependent feedback current controlling the voltage and speed characteristics.

It is common practice for machines with electrical excitation that the exciter current is controlled by the rpm using mechanical or electronic controllers with respect to obtaining the required pattern of voltage or output. For machines with permanent magnetic excitation it is also known to have a magnetic flux running as a shunt circuit to the working flux. The size of this shunt current is variable using a controller with mechanical or electrical means which thereby provides indirect control of the useful current. The controllers specified are often expensive and very susceptible to failure.

In electrically driven vehicles in which a d.c. current generator is installed in the vehicle and driven by an internal combustion engine providing current to the drive motors (for example, a diesel-electric motor coach), known designs have incorporated the principle of operating the generator unsaturated with self-excitation and constant torque in order to attain near independence of the drive input from the relevant drive impedance, which even with very low rpm variations brings about very marked voltage variations and thus produces a practically constant current output. While this system avoids output controllers, the generators, due to the unsaturated operation, are inadequately utilized and further the danger exists that damaging overvoltages will occur.

It is an object of this invention to provide an electrical machine having a desired characteristic of induced voltage as a function of the rpm without a controller. It is a further object of this invention to provide an electric machine that utilizes the electrical capabilities of the machine.

SUMMARY OF THE INVENTION

Briefly stated in accordance with one aspect of the invention, the foregoing objects are achieved by providing in at least one portion of the electrical machine windings generating or controlling the magnetic working flux, or an impedance in series with the windings connected to a rectifier, which is supplied by a.c. voltage of a frequency proportionate to the rpm of the machine by connection with a frequency-dependent impedance which is selectable on a case-by-case basis. This a.c. voltage can be induced either in a winding of the machine or preferrably in a permanent-magnet-excited auxiliary machine mechanically coupled to the main machine.

As frequency-dependent impedances the design includes, depending upon their required frequency dependency, inductive or capacitive reactances or a combination of both types of impedances, wherein at least one reactance can be supplemented by parallel connection of an ohmic impedance.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE INVENTION

In order to clarify the operation of the reactances, we will assume for the following explanations of FIGS. 1 through 6 that the voltage, U, whose frequency, f, is in proportion to the machine rpm, n, and which supplies the rectifier circuit is a constant voltage, (a fact which does not have to be the case in the various types of application).

Figure 1:
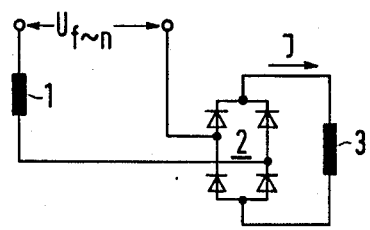
FIG. 1 is a schematic diagram of a circuit according to the invention wherein an inductive reactance is in series with the input to the rectifier circuit.

In the circuitry according to FIG. 1, the inductive reactance 1 increases with the frequency f; the current supplied to the rectifier circuit 2 and thus also the d.c. current J supplied to the machine winding 3 decrease uniformly as the rpm n increases. According the magnetic flux of this winding 3 exciting or affecting the magnetic working flux of the machine varies inversely to the rpm n.

Figure 2:
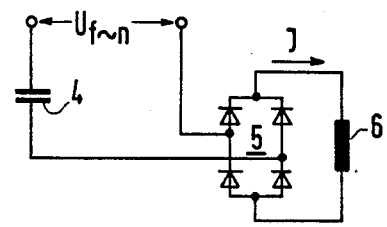
FIG. 2 is a schematic diagram of a circuit wherein a capacitive reactance is in series with the input to the rectifier circuit.

In the arrangement in FIG. 2, conversely, the current J supplied by the rectifier circuit 5 to the machine winding 6 increases with the machine rpm due to the reduction of the reactance of capacitor 4 with increasing frequency.

Figure 3:
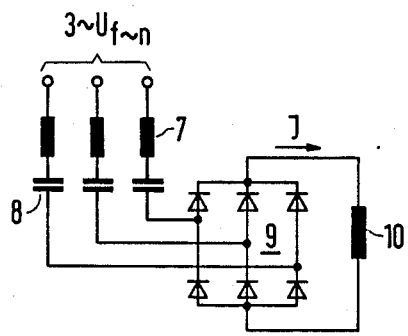
FIG. 3 is a schematic diagram of a circuit according to the invention wherein a series inductive reactance and a series capacitive reactance are in series with the input to the rectifier circuit.

In FIG. 3 the inductive reactances 7 and capacitors 8 together form a three-phase reactance which initially drops as the frequency increases, goes to zero at the resonance frequency and from that point rises again with the frequency. The current J supplied by the rectifier 9 to the machine winding 10 accordingly increases with the rpm n up to a resonance maximum and thereafter decreases.

Figure 4:
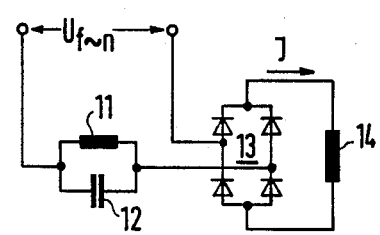
FIG. 4 is a schematic diagram of a circuit according to the invention wherein a parallel inductive reactance and capacitive reactance are in series with the input to the rectifier circuit.

The parallel connected reactances 11 and 12 in FIG. 4 together produce an initially increasing reactance as the frequency increases, i.e. a reduction of the current supplied by rectifier 13 to the machine winding 14. At the resonance frequency the reactances 11 and 12 form a blocking circuit so that current J practically disappears only to start rising again at a constant rate as the frequency continues to increase.

Figure 5:
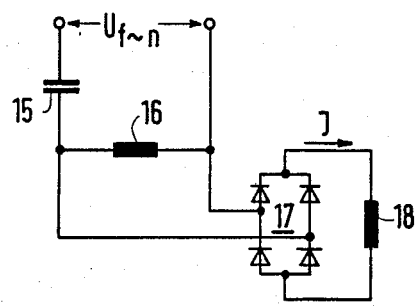
FIG. 5 is a schematic diagram of a circuit according to the invention having a capacitive reactance in series with the input to an inductive reactance connected in parallel to the rectifier circuit.

In the circuit according to FIG. 5, the voltage U over capacitor 15 supplies the rectifier 17 as well as the inductive impedance 16 arranged in parallel to the rectifier. This circuit has a similar pattern of the current J supplied by rectifier 17 to the machine winding 18 in terms of the rpm as in the arrangement according to FIG. 3. After exceeding the resonance frequency in this case, however, the current drops less rapidly than would be the case in the circuitry of FIG. 3.

Figure 6:
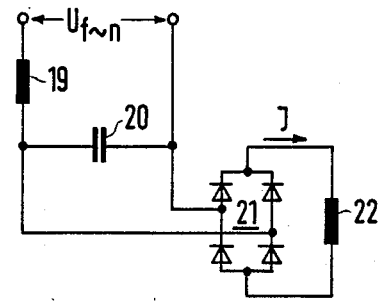
FIG. 6 is a schematic diagram of a circuit according to the invention having an inductive reactance in series with the input to a capacitive reactance in parallel to the rectifier circuit.

In the arrangement according to FIG. 6, the inductive reactance 19 is connected ahead of the rectifier 21 and the capacitor 20 connected in parallel to the rectifier. This arrangement, similar to the circuits in FIGS. 3 and 5, produces a current J in the machine winding 22 which rises with the frequency up to a maximum and then drops again. In contrast to the previous arrangements, however, here already at f=0 hz the current J is greater than 0 and therefore essentially goes to zero at a certain frequency value above the resonance frequency.

In order to adjust the coordination of the current J to the rpm n in a desired pattern, it is possible in all of the circuits to arrange a parallel ohmic impedance for at least one of the reactances. For purposes of clarity this was not shown in FIGS. 1 through 6.

Figure 7:
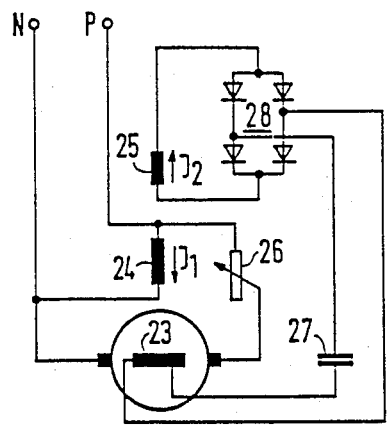
FIG. 7 diagrammatically depicts the circuitry of a d.c. motor which, as the rpm increases, has an increasingly weak field.

In motors supplied by a static converter and operating over a larger rpm range at nearly constant output (for example, vehicular motors and drive motors of machine tools) it is desirable in order to restrict the static converter type output, to weaken the magnetic working flux of the motor as the rpm increases in order thereby to permit the induced voltage to rise only slightly or not at all. FIG. 7 shows the circuitry of an embodiment having a d.c. motor automatically operating with said field weakening. The magnetic flux induced in the armature winding 23 is generated by the exciter winding 24 which conducts the current $J_1$ and is shunted to the armature. The d.c. voltage conveyed to the motor over terminals N and P is constant. For that reason the a.c. voltage drawn over taps from the armature winding and routed over capacitor 27 to the rectifier 28 is (after starting the motor with starter 26) also nearly constant. Its frequency is proportionate to the rpm n of the motor so that the current $J_2$ supplied by the rectifier 28 increases along with said rpm n in accordance with the schematic of FIG. 2. The current $J_2$ flows through the de-energizing winding 25 which thereby counteracts the exciter winding 24 and increasingly weakens the magnetic flux as the rpm n increases.

Figure 8:
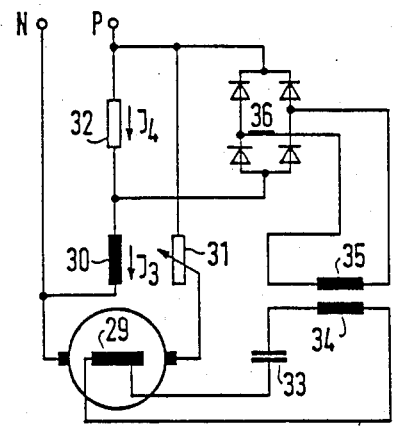
FIG. 8 diagrammatically depicts a circuit with a d.c. motor, in which the field weakening begins only at a minimum rpm.

FIG. 8 shows a circuit of another embodiment of a d.c. current motor operating with field weakening in which a separate de-energizing winding is not necessary. The magnetic flux is generated exclusively by the winding 30 which is connected by a series-impedance 32 to the constant voltage supply of the motor. The series impedance 32, moreover, is connected to the output of the rectifier circuit 36, which via the isolation transformer 34, 35 and capacitor 33 is itself connected to the taps on the armature winding 29. The capacitor 33 forms a reactance along with the inductances of the isolation transformer windings 34, 35 and the armature winding 29, which functions in accordance with the schematic of FIG. 3, i.e. produces an output voltage of the rectifier circuit 36 which rises along with the rpm n of the machine below the resonance frequency. After the motor has been run up with starter 31, the voltage supplied by the rectifier circuit 36 is up to a certain rpm n smaller than the voltage drop which is produced by the exciter current $J_3$ across the series impedance 32, i.e., the recitifier remains de-energized which means $J_4 = J_3$; and the machine operates with constant excitation. Only when the rectifier voltage exceeds the specified voltage drop, does the rectifier also supply current so that current $J_4$ becomes larger than $J_3$. Since, however, the total of the voltage drops on winding 30 and the series impedance 32 has to remain the same as the supply voltage, this means that current $J_3$ is reduced, i.e., there is a field weakening which therefore increases with the current $J_4$, i.e., with the rpm n. The arrangement described has the advantage that the field weakening only begins at a specific rpm n which can be selected on a case-by-case basis by modifying the series impedance 32 and/or the isolation transformer 34, 35 and/or the capacitor 33.

Figure 9:
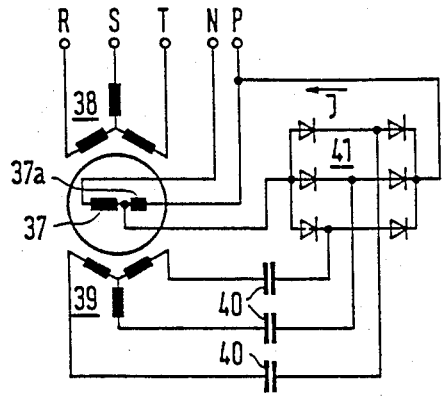
FIG. 9 diagrammatically depicts a circuit of a three-phase motor with field weakening similarly commencing as of a minimum rpm.

In a further embodiment, a synchronous motor which is energized by the exciter windings 37, 37a in accordance with FIG. 9, the need for a impedance in series with these windings can be eliminated. The armature winding 38 of the motor is connected to the terminals R, S, T of a practically constant frequency, variable three-phase voltage. The exciter windings 37, 37a wired in series are supplied by terminals N, P with a constant d.c. voltage, for example, from the intermediate circuit of a static converter supplying the motor. To separate the potential of the circuit producing the field weakening from the working circuit, the stator incorporates an additional three-phase winding 39, which supplies a practically constant voltage at a frequency proportionate to the rpm and supplies the rectifier circuit 41 through the capacitors 40. The operation of this arrangement corresponds to the schematic in accordance with FIG. 3. Rectifier circuit 41 is connected at the output side to the exciter winding 37a. As long as the voltage drop generated by the current supplied to terminals N and P at the exciter winding 37a is greater than the output voltage of the rectifier circuit 41, the latter remains de-energized and the motor works at a constant excitation level. Only as of a certain frequency, i.e., upwards of a certain machine rpm, does the rectifier circuit voltage exceed the specified voltage drop; the current in the exciter winding 37a increases; thus the current in the exciter winding 37 decreases. If the ohmic impedance of the exciter winding 37a is sized larger than would correspond to the winding number ratio to the exciter winding 37, i.e. more resistance per ampere-turn, then here as well there will be an increasing field weakening commencing at a certain rpm and increasing thereafter along with it. The required impedance increase of the exciter winding 37a can, for example, be obtained, by a correspondingly smaller cross-section of the winding wire and/or a series resistance between this winding and terminal P.

Figure 10:
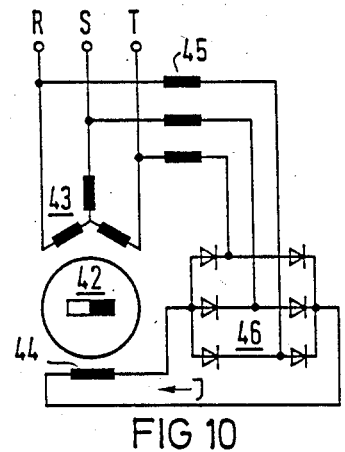
FIG. 10 diagrammatically depicts the circuit of a three-phase motor with permanent magnet excitation of the motor, whose magnetic working flux increasingly weakens as the rpm rises.

FIG. 10 shows the circuit of a synchronous motor with a permanent magnet energized field. The permenant magnet 42 installed in the rotor generates on the one hand a working flux which is induced in the stator winding 43 connected to the three-phase terminals R, S, T, and on the other hand generates a shunt circuit flux which as a constant flux is induced in the further stator winding 44. As is known from U.S. Pat. No. 2,802,959, the shunt circuit flux permeating the other stator winding 44 can be controlled by co- or counter-excitation. Thereby the working flux can be indirectly controlled. This type of working flux control by counter-excitation of the shunt circuit flux is applied in the synchronous motor shown in FIG. 10. The frequency-variable terminal voltage assumed to be nearly constant in operation feeds rectifier circuit 46 over inductive impedances 45, with the rectifier in turn supplying current J to winding 44 of the motor. This arrangement operates in accordance with the schematic of FIG. 1, i.e., as the frequency increases, current J decreases and thereby also the counter-excitation of the shunt circuit flux, i.e., allowing this flux to increase which brings about a reduction of the working flux.

Figure 11:
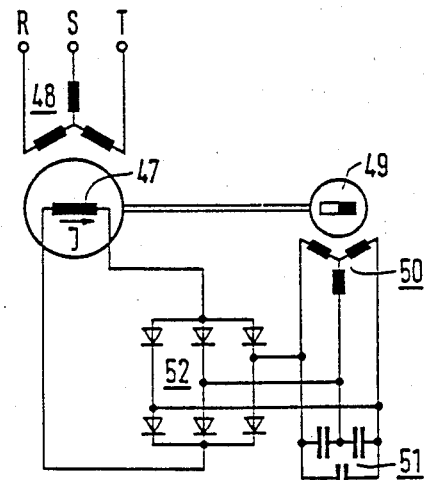
FIG. 11 diagrammatically depicts the circuit of a three-phase generator nearly rpm-independent voltage.
Figure 12:
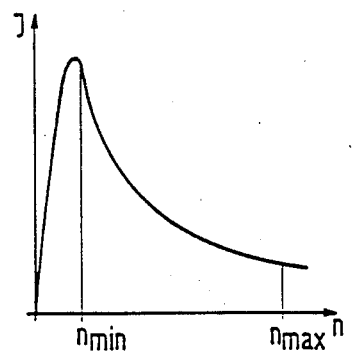
FIG. 12 shows the pattern of the exciter current of the generator in accordance with FIG. 11 as a function of the rpm.

FIG. 11 shows the circuitry of a three-phase synchronous generator embodiment of the invention which supplies an approximately constant voltage over a larger rpm range. This is, for example, advantageous for wind-power as well as airborne power supply system generators working with rectifiers since then the rectifiers either require only a very small control range or could on a case-by-case basis remain totally without any control arrangements. The exciter winding 47 which induces the armature winding 48 of the stator, is connected to the output of the rectifier circuit 52. This rectifier circuit, along with the capacitors 51 in parallel to the rectifier circuit, is supplied by the winding 50 of a coupled auxiliary machine energized by a permanent magnet rotor 49. The inductance of winding 50, along with capacitance 51, produces the mode of operation of the schematic in FIG. 4. Thus one can attain the hyperbolic pattern of the exciter current J over the rpm n in a range between $n_{min}$ and $n_{max}$ above the resonance frequency as shown in FIG. 12, as is required for constancy of the voltage induced in the generator winding 48. The auxiliary machine can also be omitted by having the rectifier circuit 52 along with the capacitors 51 either connected to the generator winding 48 itself or to an auxiliary winding in the generator stator, for example, to attain a higher voltage.

Figure 13:
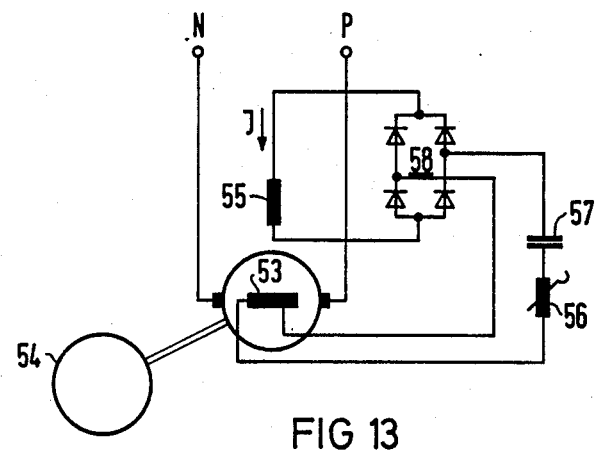
FIG. 13 diagrammatically depicts the circuitry of a d.c. generator for steep rpm-dependency of its voltage.
Figure 14:
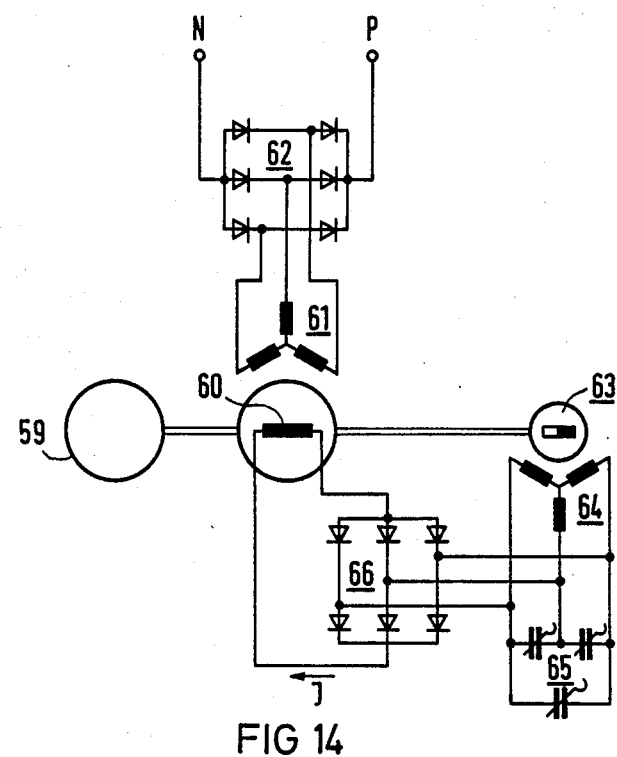
FIG. 14 diagrammatically depicts the circuitry of a three-phase generator operating with a rectifier circuit for steep rpm-dependency of its voltage.

FIG. 13 shows a circuit of a d.c. generator embodiment of the invention, which, for example, supplies the drive motors of a vehicle and even with slight changes in its rpm produces marked voltage variations in the same direction. If such a generator is driven at a constant torque, for example, by a diesel engine 54 with a constant cylinder fuel charge, then the specified voltage pattern produces a practically constant output. The armature winding 53 of the generator supplies via taps an a.c. voltage whose frequency is proportional to the rpm which acts on rectifier circuit 58 through reactance coil 56 and capacitor 57. The inductances of the armature winding 53 and reactance coil 56, together with capacitor 57, produce the mode of action of the schematic shown in FIG. 3, wherein below the resonance frequency, even given constant generator voltage, a steep, co-directional frequency dependency of the exciter current J can be obtained. When the generator voltage also increases along with current J, this brings about an additional positive feedback effect which substantially increases the voltage increase with the rpm increases and also permits operation into the high efficiency saturation range of the generator. Thus, in contrast to the previous state of the art of engineering, the capabilities of the machine can be completely utilized. In order to be able to change the resonance frequency of the exciter current and thus the operating rpm of the generator, the reactance coil 56 is designed with variable inductance. FIG. 14 shows the circuit of a synchronous generator embodiment of the invention which similarly shows a marked voltage increase given slight rpm increases and thus operates analogously to the d.c. generator of FIG. 13, supplying motors through rectifier circuit 62. The exciter winding 60 of the generator driven by an internal combustion engine 59 at a constant torque induces the stator winding 61 which conducts its output to rectifier circuit 62. A coupled auxiliary machine excited by a permanent magnet rotor 63 generates a three-phase voltage in its stator winding 64 whose size and frequency are proportional to the rpm. This voltage operates over the inductance of stator winding 64 on rectifier circuit 66 and the parallel-connected capacitors 65 in accordance with the schematic of FIG. 6. Thus below the resonance frequency a steep increase of the exciter current J and thus of the generator voltage is attained as the rpm increases. This effect is reinforced by the fact that the induced voltage in the stator winding 64 also increases along with the rpm. The resonance frequency and thus the operating rpm can be adjusted by changes in the capacitances of the capacitors 65.

What is claimed as new and desired to be secured by Letters Patent of the United States is:

1. An electrical machine with variable rotational speed whereby:

an exciter winding (37, 37a) producing a working flux is connected to an exciter d.c. voltage (NP);

a part (37a) of the exciter winding is connected to an output of a rectifier (41) in such a fashion that the rectifier (41) only feeds a current (J) into this part of the exciter winding when its output voltage exceeds the voltage drop which is caused by the current supplied by the exciter d.c. voltage (N, P) into this part of the exciter winding; and an input of the rectifier (41) is connected through at least one capacitor (40) to an induced winding (39) of the machine (FIG. 9).

2. An electrical machine with variable rotational speed whereby at least a part of an exciter winding (30) producing a magnetic working flux is connected to an exciter-d.c., voltage (NP) through a series resistor (32); and the series resistor (32) further is connected across an output of a rectifier (36) which is connected with its rectifier input to a secondary winding (35) of an isolation transformer, whose primary winding (34) is connected through a capacitor (33) in series to taps of machine windings, whereby the primary winding of the isolation transformer and the capacitor form a frequency dependent reactive impedance (FIG. 8).

3. An electrical machine having a working flux and a variable rotational speed comprising:

means for generating an a.c. voltage having a frequency proportional to the machine rotational speed;
a frequency dependent impedance circuit selectable to provide a predetermined operating voltage-speed characteristic having an input connected to said a.c. voltage generating means;
a rectifier circuit having an input connected to an output of said frequency dependent impedance circuit;
means for controlling the working flux of the electrical machine including a resistance in series with a winding providing said working flux connected to the output of said rectifier circuit;
a tapped armature winding having an output connected to a series capacitive reactance and inductive reactance combination wherein the inductive reactance is a primary winding of an isolation transformer; and
a secondary winding of said isolation transformer connecting to the input of said rectifier circuit controlling said working flux by variations in the voltage drop across said resistance in series with said working flux winding.

* * * * *